April 12, 1938. J. P. BENOIT 2,113,929
DUAL LEHR LOADER
Filed Sept. 29, 1934 11 Sheets-Sheet 1

April 12, 1938. J. P. BENOIT 2,113,929
DUAL LEHR LOADER
Filed Sept. 29, 1934 11 Sheets-Sheet 4

INVENTOR.
Joseph P. Benoit
BY
J. F. Rule ATTORNEY

April 12, 1938.  J. P. BENOIT  2,113,929
DUAL LEHR LOADER
Filed Sept. 29, 1934  11 Sheets-Sheet 8

Joseph P. Benoit
INVENTOR.

BY J. F. Rule
ATTORNEY

April 12, 1938. J. P. BENOIT 2,113,929
DUAL LEHR LOADER
Filed Sept. 29, 1934 11 Sheets-Sheet 9

INVENTOR.
Joseph P. Benoit
BY
J. F. Rule, ATTORNEY

Patented Apr. 12, 1938

2,113,929

UNITED STATES PATENT OFFICE 2,113,929

DUAL LEHR LOADER

Joseph P. Benoit, Alton, Ill., assignor to Owens-Illinois Glass Company, a corporation of Ohio Application September 29, 1934, Serial No. 746,046

11 Claims. (Cl. 198—31)

My invention relates to apparatus for receiving glassware such as bottles, jars and the like delivered from forming machines, and transferring them to an annealing lehr. It is customary to place the bottles or other articles in an upright position on a belt conveyor as they are discharged from the forming machine and convey them to a cross conveyor extending across the front end of the lehr. The articles are automatically transferred to the cross conveyor which carries them in a row across the front of the lehr. They are then transferred, a row at a time, to the lehr conveyor by means of a pusher bar or the like which places them in transverse rows on the lehr conveyor.

An object of the present invention is to provide a duplex apparatus of the character indicated for receiving articles from two forming machines and transferring them to the same lehr, the articles from the two machines being placed on separate portions of the lehr conveyor.

A further object of the invention is to provide adjusting means by which portions of the lehr allotted to the articles from each machine may be adjusted and apportioned to correspond with the relative amount of lehr space required for the output from the two machines, determined by the size, shape and number of the particular articles which are being made at any time. For example, if the two machines are blowing bottles at the same rate, but the bottles from one machine are of larger diameter than those from the other, they require a wider section of the lehr conveyor. If the molds on either machine are changed to produce ware of a different diameter, a corresponding change would be required in the lehr space allotted to the ware from the two machines. An aim of the present invention is to provide means by which the relative amount of space allotted to the two machines may be readily adjusted to meet such requirements.

A further object of the invention is to provide simple and practical means by which the bottles or other articles may be accurately spaced on the carrying-in or cross conveyors from which they are transferred to the lehr conveyor and further to provide adjusting means by which the spacing may be adjusted to correspond to the diameters of the articles.

A further object of the invention is to provide a duplex mechanism of the character indicated by means of which the articles received from one machine are kept entirely separate from those supplied by the other machine, throughout the transfer and annealing operations.

Other objects of the invention will appear hereinafter.

Referring to the accompanying drawings:

Figs. 9 to 11 are detail views of mechanism for reciprocating a pusher bar.

As the duplex mechanisms are substantially similar in construction and operation, a detail description of one will suffice for both. The apparatus will, for convenience, be hereinafter referred to as used for handling bottles.

General construction

Figure 17:
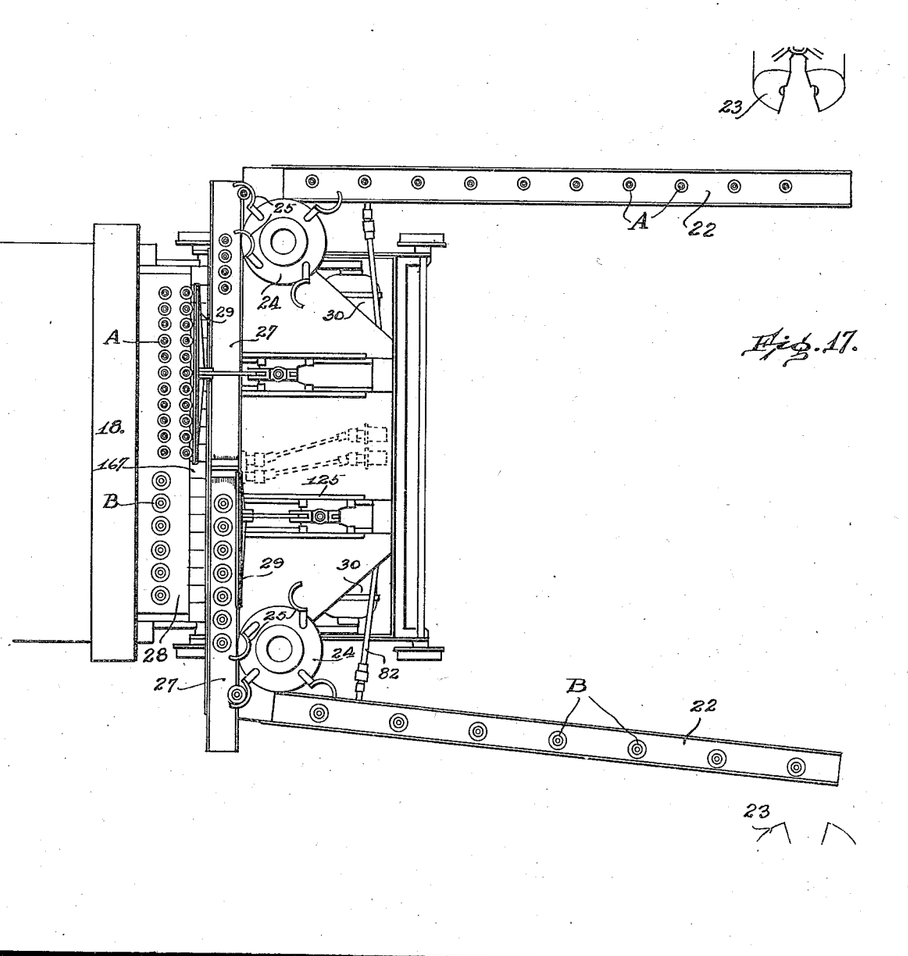
Fig. 17 is a somewhat diagrammatic top plan view of the transfer mechanism and the annealing lehr.

In general terms, the apparatus comprises duplex mechanisms mounted on a framework 20 supported on wheels 21 permitting the apparatus to be moved to and from its operating position directly in front of the lehr 18 (Fig. 17). The two mechanisms which are individual to the bottle blowing machines which supply the bottles thereto, are substantially identical in construction and operation, except that they are right and left handed, respectively, for carrying the bottles inward from opposite sides of the lehr toward the center thereof. The bottles A and B are delivered seriatim from the molds 23 of the forming machines to endless belt conveyors 22. These conveyors extend forwardly to and along the outer ends of the duplex machines and are hereinafter referred to as the machine conveyors or end conveyors.

Turn tables 24 carrying transfer arms 25, transfer the articles to cross conveyors 27 extending across the front of the lehr. Each cross conveyor 27 receives the bottles as they are transferred thereto by the turn table and carries them toward the center of the lehr entrance, thus bringing a row of bottles into position for transfer to the lehr conveyor 28.

Pusher bars 29 operate intermittently to push the rows of bottles forward off the cross conveyors 27 and onto the lehr conveyor. Each pusher bar after its forward movement to transfer a row of bottles to the lehr, is moved vertically upward to clear the oncoming bottles on the conveyor 27 and then rearwardly and downwardly to its starting position. The up and down movements of the pusher bars are effected by air operated piston motors 35 individual to the pusher bars, as hereinafter more fully described. The two cross conveyors 27 are mounted on a single supporting frame 36 extending the entire length of the two conveyors and which is adjustable in the direction of its length for shifting the conveyors transversely of the lehr to positions corresponding to the relative lengths of the rows of bottles placed thereon.

Electric motors 30 which run continuously in synchronism with the bottle blowing machines, operate through belts 32 and other mechanism, hereinafter described, to rotate the turn tables 24. Each motor 30 also operates through power transmitting mechanism including a belt 33 at the opposite end of the motor from the belt 32, to drive an end conveyor 22, a cross conveyor 27 and mechanism for reciprocating a pusher bar.

A more detailed description of the mechanism is as follows:

Turn table mechanism

Figure 2:
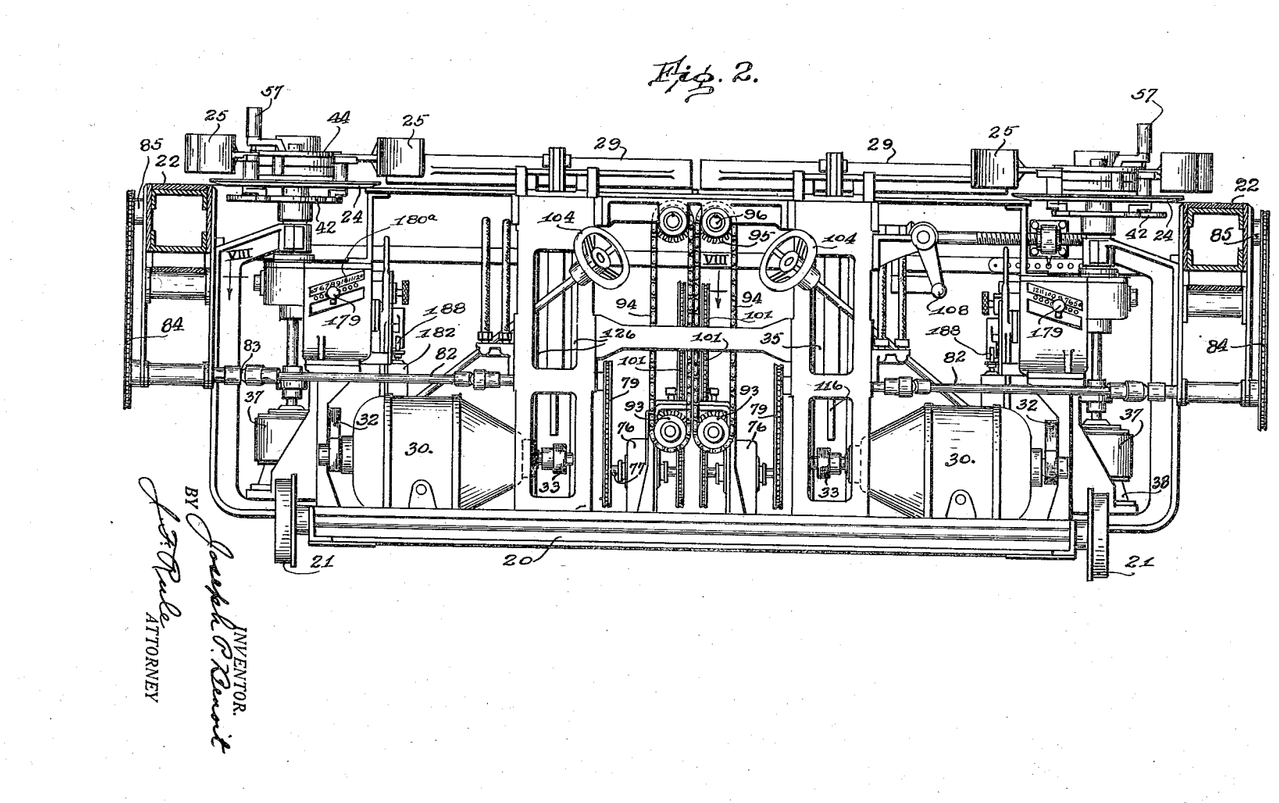
Fig. 2 is a front elevation of the same.
Figure 12:
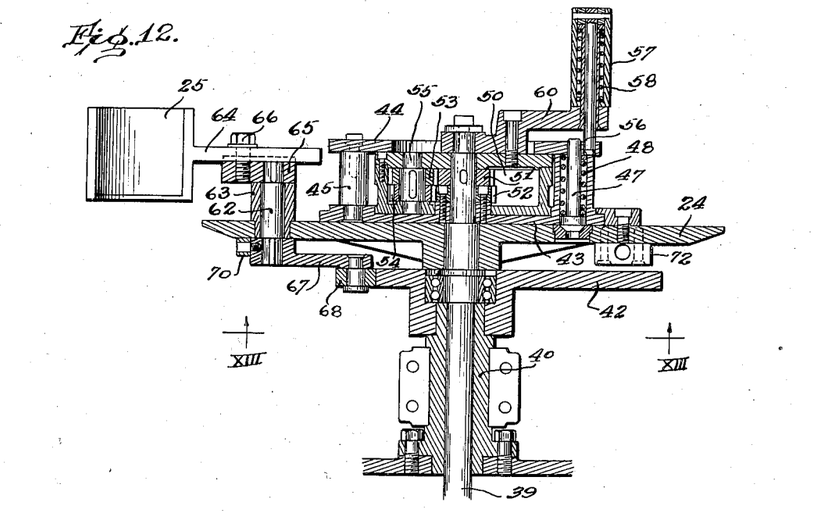
Fig. 12 is a sectional elevation of a turn table and associated mechanism.

The mechanism for rotating the turn tables 24 includes the chain belts 32, each driven by a motor 30 and driving a shaft in a gear box 37 (see Figs. 2, 6, and 8) mounted on a bracket 38. Power is transmitted through gearing in the box 37 to a shaft 39 extending upward therefrom. The turn table 24 (see Figs. 6, 12, and 13) is freely mounted on the shaft 39 near the upper end thereof. The shaft extends through a stationary bearing sleeve 40. A stationary cam plate 42 positioned beneath the turn table, has a fixed mounting on the sleeve 40. Directly over the turn table 24 and resting thereon is an annular bearing frame comprising a lower plate 43 (Fig. 12) and an upper plate 44 connected by spacing blocks 45. This annular frame normally rotates with the turn table, being detachably connected for such rotation by a detent 47 having a beveled head fitting a corresponding recess in the turn table and yieldingly held therein by a spring 48. This construction serves as a safety device, permitting the shaft 39 to rotate independently of the turn table in the event of any obstruction to the normal rotation of said table.

Between the plates 43 and 44 is a gear box 50 within which is a gear 51 keyed to the shaft 39, a gear 52 connected to the plate 43, gears 53 and 54, both keyed to a stud shaft 55 journaled in the gear box. The gears 53 and 54 mesh with the gears 51 and 52, respectively. The gear 51 is of slightly smaller diameter than the gear 52, and the gear 54 is correspondingly of smaller diameter than the gear 53. The gear box is normally connected to rotate with the annular bearing frame 43, 44 and the turn table by means of a locking pin 56 connected to a handle 57 and yieldingly held by a spring 58 in its locking position in which the pin projects into one of an annular series of holes 59 (Fig. 1) in the plate 44. The rod 56 is mounted on an arm 60 bolted to the gear box 50.

The purpose of the mechanism just described is to permit rotative adjustment of the turn table 24 relative to its driving shaft 39 and thereby adjust the bottle transfer arms 25 forwardly or rearwardly relative to the oncoming bottles on the conveyor 22. Such adjusting mechanism operates as follows: By raising the handle 57, the locking pin 56 is withdrawn, permitting the arm 60 and with it the gear box, to be rotated about the shaft 39. Such rotation causes the gear 53 to roll on the gear 51, thereby rotating the stud shaft 55 about its own axis and causing the gear 54 to rotate about its axis and also roll on the gear 52. Owing to the differential between the upper and lower gears in said gear box, the gear 52 is given a slow rotation on the shaft 39, thereby rotating the bearing frame 43, 44 and with it the turn table on the shaft. This differential is such that movement of the handle 57 to carry the locking pin from one opening 59 to the next imparts only a very slight movement to the turn table, so that a fine adjustment of the latter may be made.

Figure 1:
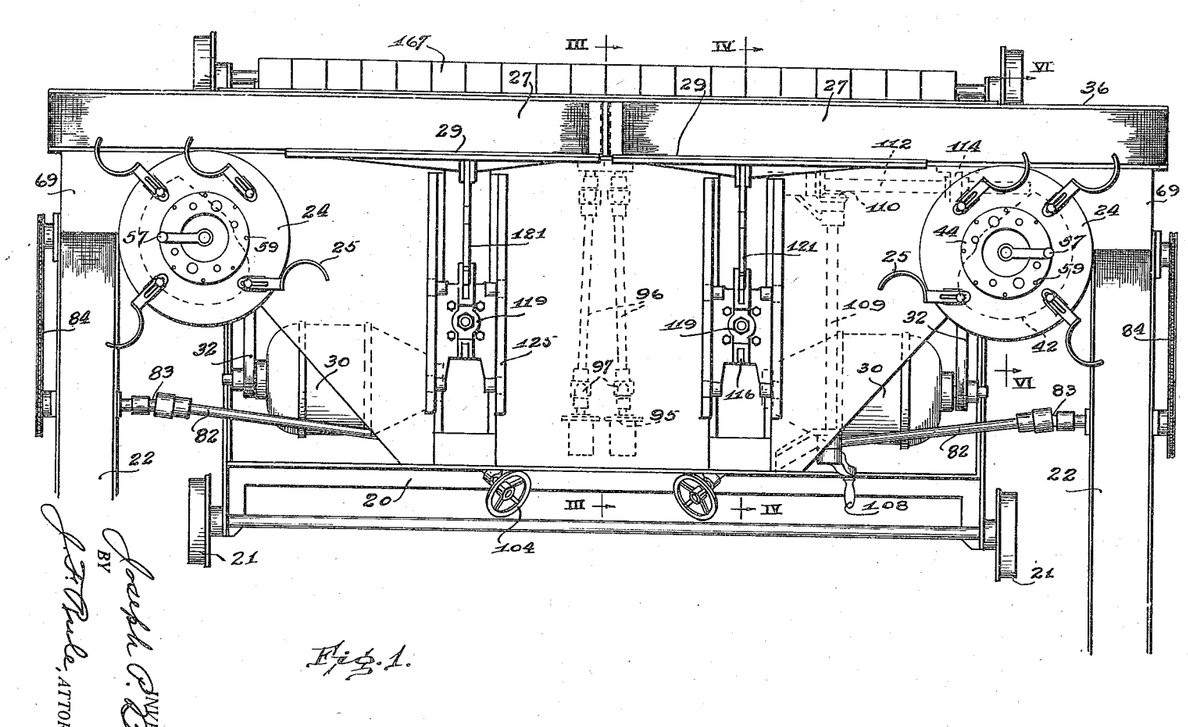
Fig. 1 is a plan view of a duplex machine constructed in accordance with my invention.

The transfer arms or paddles 25, as shown, are curved or semi-cylindrical to fit correspondingly shaped ware. Other shapes may be employed, as may be required for bottles or articles of other shapes. Each arm 25 is mounted on a rock shaft 62 (Fig. 12) journaled in a bearing sleeve 63 on the turn table. The arm 25 has a straight shank 64 which is adjustable lengthwise in a guide block 65 keyed to the rock shaft. The arm is clamped in adjusted position by a bolt 66. This construction permits the arms to be adjusted toward and from the axis of the turn table and also permits said arms to be removed and replaced by others of different shapes or sizes. The rock shaft 62 extends below the turn table and has keyed to its lower end a rock arm 67 carrying a cam roll 68 which runs on the stationary cam plate 42. The latter is shaped to impart rocking movements to the transfer arms. As shown in Fig. 1, the cam is so shaped that it swings the arms forwardly and outwardly as they approach the conveyor 22, into a position to properly engage the oncoming bottles and carry them forward over a transfer platform 69 and onto the cross conveyor 27. The arms are then given a backward swinging movement by the cam relative to the turn table so as to retract said arms from the bottles and leave the latter positioned in spaced relation on the cross belt 27.

Figure 13:
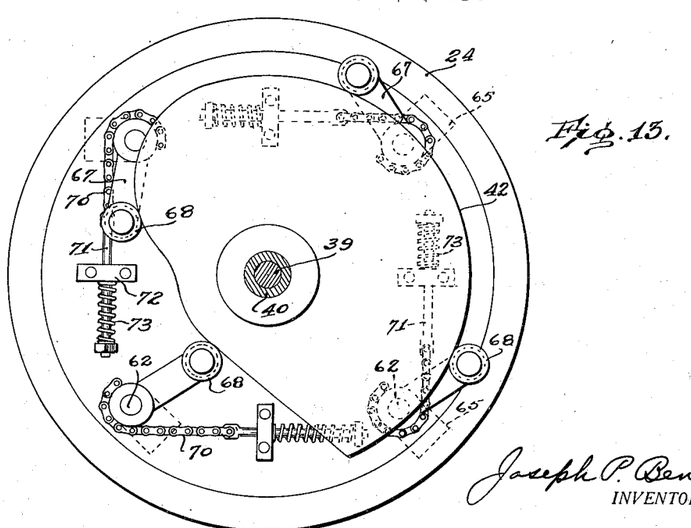
Fig. 13 is a section at the line XIII—XIII on Fig. 12, giving a bottom view of such mechanism.

As shown in Fig. 13, each roll 68 is held against the cam 42 by means including a chain 70 attached at one end to the hub of the rock arm 67 and at its other end to a rod 71. The rod is movable lengthwise in a bearing 72 on the turn table and is under the tension of a spring 73.

Driving connections for conveyors and pusher bars

Driving connections extend from each of the main motors 30 through belt 33 to an end conveyor 22, cross conveyor 27 and the mechanism for reciprocating the pusher bar 29, said connections being as follows:

The driving train from the belt 33 to the end conveyor includes a shaft 75 (Figs. 4 and 8) driven by belt 33. The opposite ends of the shaft 75 extend into a gear box 87 and a gear box 76. The shaft operates through gearing in the box 76 to drive a shaft 77 which carries a sprocket wheel 78 over which runs a sprocket chain 79 (Figs. 3 and 8), the latter driving a sprocket wheel 80 on a shaft 82. The shaft 82 is made in sections connected by universal joints 83 and extends outwardly to a point beyond the end conveyor 22 (see Figs. 1 and 2) and carries at its outer end a sprocket wheel which operates through a chain 84 to drive a roll 85 over which runs the end conveyor 22 and by which the latter is continuously driven.

Driving connections from each motor 30 to the corresponding cross conveyor 27 includes the belt 33, shaft 75, and gearing within the gear box 87 (Figs. 4 and 8), the latter containing speed changing gear mechanism 88. A shaft 89 driven by the speed changing gearing and extending from the gear box 87 extends to a gear case 90 (Figs. 3 and 8), and through gearing therein drives a sectional shaft 92 extending rearwardly from the gear case. A sprocket wheel 93 on the end of the shaft 92 drives a sprocket chain 94 extending upwardly to a sprocket wheel 95 on a shaft 96. The latter is made in sections connected by universal joints 97 and extends forward to a driving roll 98 which drives the cross conveyor 27.

The driving connections from each motor 30 to the mechanism which reciprocates the pusher bar 29, includes the motor belt 33, shaft 75, gearing in box 76 and shaft 77. On the opposite end of the shaft 77 from the sprocket wheel 78 is a sprocket wheel 100 over which is trained a sprocket chain 101 extending to and driving the unit 102 which operates as hereinafter described to reciprocate the pusher bar 29.

The speed changing mechanism within the gear box 87 is adjustable by means of a hand wheel 104 operating through a shaft 105, gears 106 and shaft 107, the latter extending into the gear box 87. The speed changing mechanism may be of conventional or any approved form and need not be described in detail. By rotating the hand wheel 104 the mechanism may be adjusted to increase or decrease the speed of the cross conveyor relative to the speed of the end conveyor.

Cross conveyor adjustment

Figures 14, 15:
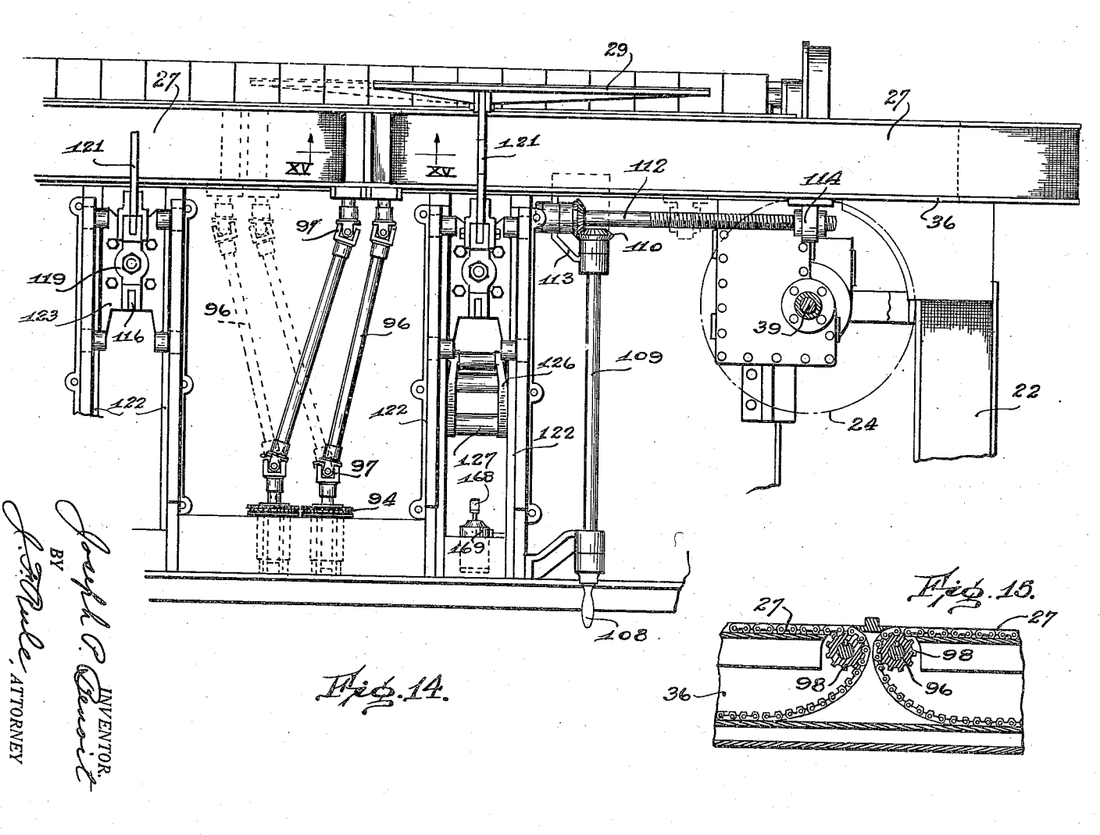
Fig. 14 is a fragmentary part sectional plan view of the machine.
Fig. 15 is a section at the line XV—XV on Fig. 14.

The mechanism for adjusting the two cross conveyors 27 as a unit in the direction of their length comprises a hand crank 108 (see Figs. 2 and 14) on a shaft 109 which operates through bevel gears 110 to drive a shaft 112 supported at one end in a bearing bracket 113. The shaft 112 has a screw threaded connection with a nut 114, the latter connected with the frame 36 carrying the cross conveyors. The hand crank 108 when rotated operates through the mechanism just described to shift the frame 36 lengthwise and thus adjust the cross conveyors to positions corresponding to the length of the rows of bottles supplied to the respective conveyors.

Pusher bar operating mechanism

Each pusher bar 29 (see Figs. 3, 4, and 14) is reciprocated vertically by means of its piston motor 35. The motor includes a piston 117 and a piston rod 118 to the upper end of which is rigidly secured a head 119. Vertical guide bars 120 are secured to and extend downward from the head 119 through guideways which may be formed in wings 116 (see Fig. 8) integral with the motor cylinder. The pusher bar 29 is attached to the forward end of an arm 121 which is secured to and extends forward from the head 119. The motor 35 is mounted for forward and rearward reciprocating movement between parallel frame members or beams 122 extending from the front to the rear of the main frame work and forming a part thereof. A carriage 123 rigidly connected with the motor cylinder is provided with rolls 124 which run in guideways 125 in the frame members 122. It will be seen that with the construction just described, vertical reciprocation of the motor piston 117 will carry the pusher bar up and down, while reciprocation of the carriage 123 will move the motor and pusher bar forwardly and rearwardly as a unit.

The driving unit 102 (see Figs. 3 and 4) has driving connections for reciprocating pusher bar, including a rocker frame 126 having a pivotal connection 127 at its lower end with the base of the machine and extending upwardly at the rear of the motor 35, and a horizontally disposed yoke or frame 128 pivoted at its ends to the rocker frame 126 and the motor cylinder respectively. A connecting rod 130 is pivoted at one end to the rocker 126 and extends forwardly therefrom to the driving unit 102. The forward end of the rod 130 is connected, as by means of a wrist pin 131 (Figs. 8 and 9), to a crank 132 keyed to a shaft 133 forming part of the driving unit 102. The crank 132 is in the form of a cam plate or disk and also functions as a valve operating cam as hereinafter set forth. The connecting rod 130 includes a yoke-shaped portion (see Fig. 8) comprising a pair of arms which straddle the motor cylinder.

The forward portion of the connecting rod comprises telescoping sections including a rod 134 (see Figs. 4 and 9) attached to a bearing block 135 in which the wrist pin 131 is journaled. The rod 134 is movable lengthwise in the tubular end portion 136 of the connector 130. These parts are normally held against relative movement by means of a spring 137 mounted on a pin 138 attached to the bearing block 135 and movable lengthwise through a bearing lug 139 fixed to the tubular section 136. This construction provides a safety device permitting rotation of the crank 132 without operating the pusher bar in the event of any obstruction offering undue resistance to reciprocating movement of said bar.

Figure 9:
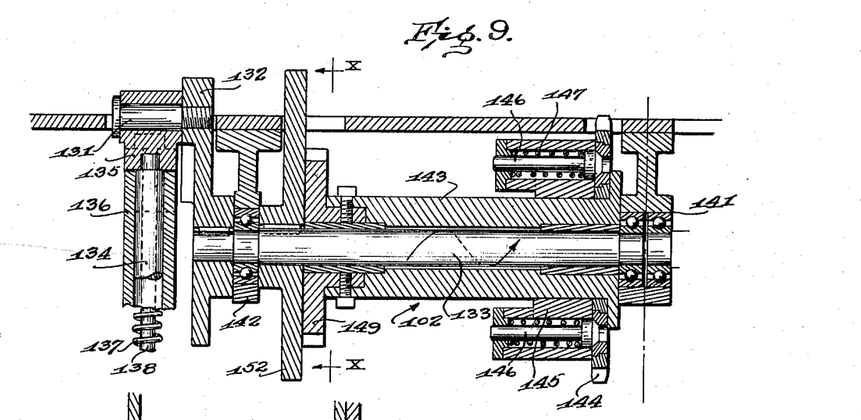
Fig. 9 is a sectional elevation of such mechanism.
Figures 10, 11:
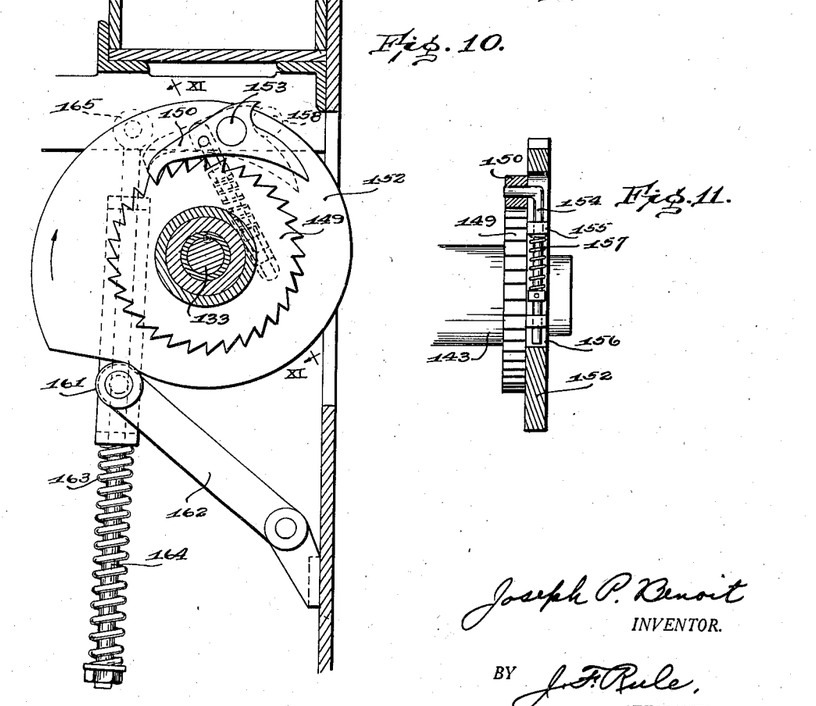
Fig. 10 is a section at the line X—X on Fig. 9.
Fig. 11 is a section at the line XI—XI on Fig. 10.

The driving unit 102, which will now be described, is actuated intermittently and during each operation one complete rotation is given to the shaft 133 which thereby gives one complete reciprocation to the pusher bar. Referring to Figs. 9 to 11, the shaft 133 is journaled in bearings 141 and 142 supported on the machine frame. A hub or sleeve 143 is mounted on the shaft 133 and is rotatable relative thereto. A driving sprocket 144 over which the driving chain 101 is trained, is mounted on and drives the hub 143.

The driving connection between the sprocket wheel and hub includes a safety device comprising an annular member 145 freely mounted on the hub and carrying pins 146 which are held by springs 147 in frictional driving engagement with the sprocket wheel 144. Any abnormal resistance to the rotation of the hub 143, as for example, that caused by an obstruction in the path to the pusher bar, causes the pin 146 to yield so that the sprocket 144 will rotate idly.

Secured to the hub 143 is a ratchet wheel 149 adapted to drive a dog 150 having a pivotal connection 153 with a driving disk 152 keyed to the shaft 133. The dog is held in engagement with the ratchet 149 by means of a rod 154 pivoted to said dog and movable lengthwise in bearings 155 in a slot 156 in the disk 152. A coil spring 157 is mounted on and operates through the rod 154 to hold the dog in engagement with the ratchet 149. The dog is released from the ratchet by a holding pin or plunger 158 connected to the piston of an air motor 160 (Fig. 8) and actuated as hereinafter described.

The sprocket wheel 144 is rotated continuously thereby imparting continuous rotation to the ratchet wheel 149. While the dog 150 is held out of engagement with the ratchet wheel by the pin 158, the disk 152 remains at rest. When the pin is withdrawn the dog engages the ratchet so that rotation is imparted to the disk 152, thereby rotating the crank 132 and through the mechanism heretofore described operates to reciprocate the pusher bar 29. Before the disk 152 completes its rotation, the plunger 158 is returned to operative position in the path of the dog 150, and lifts the latter from the ratchet wheel as the rotation is completed. The disk 152 and parts connected therewith are held against movement when disconnected from the ratchet wheel, by means of a friction roll 161 which bears on the periphery of the disk. Said friction roll is carried by a rock arm 162, and is held against the disk by the tension of a coil spring 163 mounted on a rod 164 pivoted at 165 to the framework of the machine.

Figure 3:
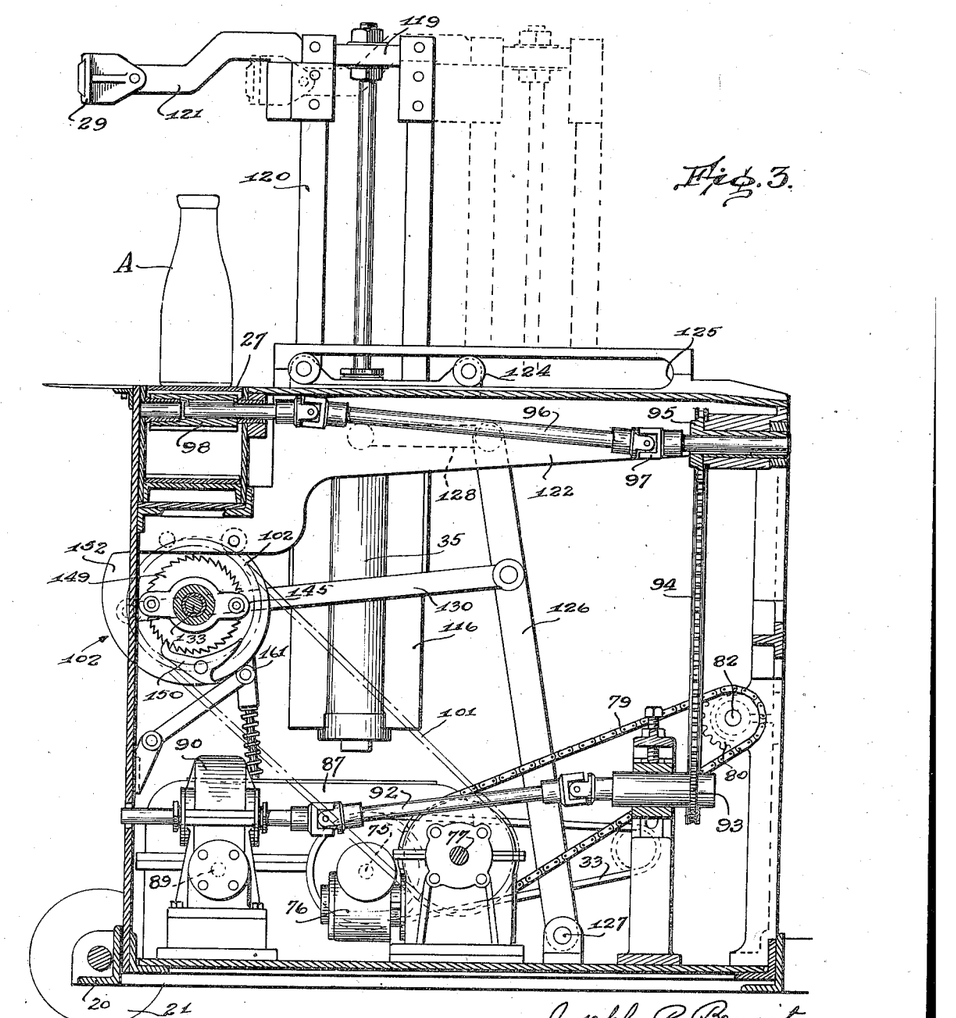
Fig. 3 is a sectional side elevation, the section being taken at the center of the machine, as indicated by the line III—III on Fig. 1.
Figure 4:
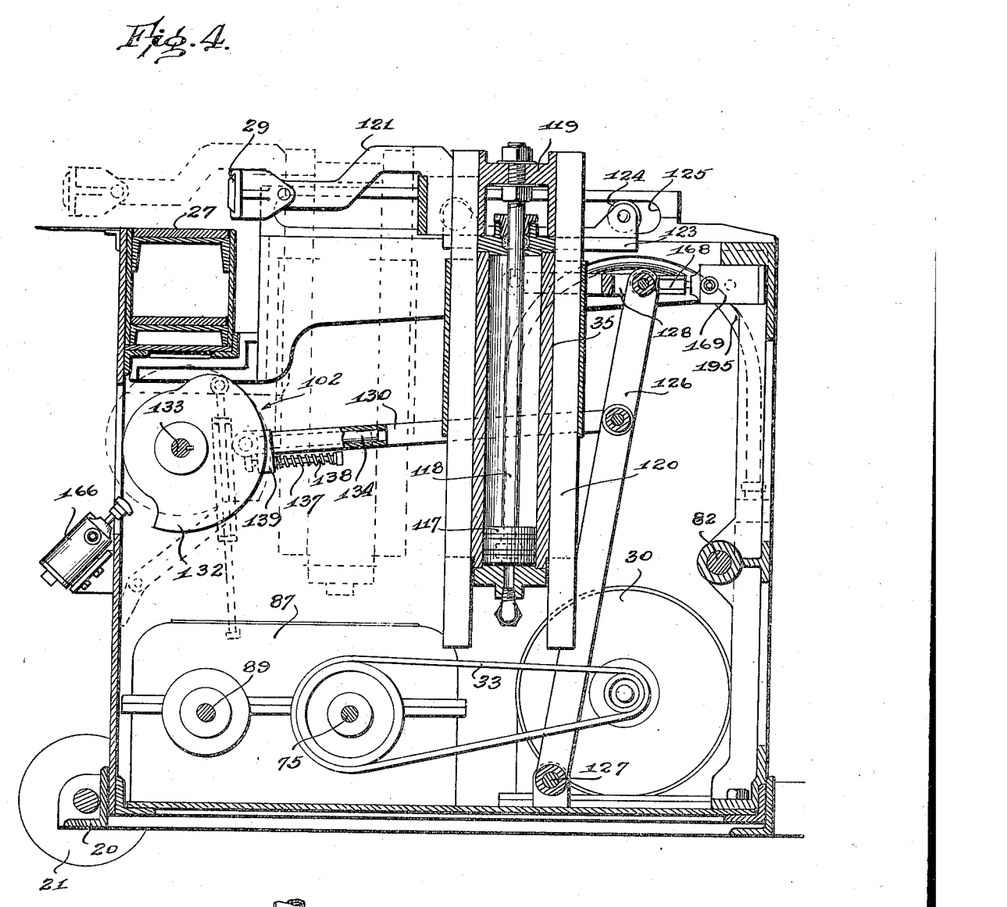
Fig. 4 is a sectional elevation at the line IV—IV on Fig. 1.
Figure 5:
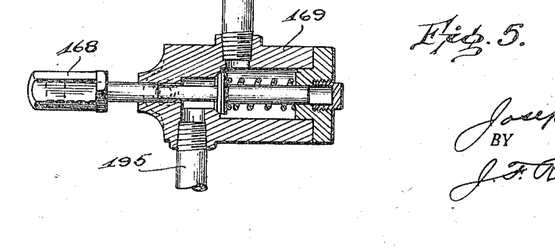
Fig. 5 is a detail section of a valve.

At the time the plunger 158 is retracted to initiate the operation of the driving unit 102, the pusher bar is in its lowered retracted position shown in full lines in Fig. 4. During the first half of the rotation of the driving disk 152, the pusher bar moves forward over the cross conveyor, thereby pushing a row of bottles forward across a narrow platform 167 and onto the lehr conveyor 28. As the bar completes its forward movement, the cam plate 132 engages the stem of a valve 166 (Figs. 4 and 16) and opens the valve. Air pressure is thereby supplied to the lower end of the piston motor 35, so that the piston 117 is moved upward and lifts the pusher bar to the position shown in full lines in Fig. 3. The pusher bar remains elevated while it is moved horizontally rearwardly to the dotted line position (Fig. 3). At the completion of the horizontal return movement of the pusher bar, the rocker frame 126 engages the stem 168 (Figs. 4 and 5) of a valve 169 and opens said valve, thereby supplying air to the upper end of the piston motor 35 and causing it to lower the pusher bar.

The pusher bar is operated at adjustably variable intervals, the length of which depends on the length of time required to place a row of bottles in position in front of the bar. For example, if the bottles are of large diameter, so that comparatively few are required to complete a row, the time intervals at which the pusher bar is operated must be comparatively short. If the size or shape of the bottles is such that a comparatively large number is required to complete a row, the time intervals at which the pusher bar operates must be correspondingly increased. As can be seen from Fig. 14, when a material lateral adjustment is made on the conveyors 27, pusher bars 29 of different length, shown in dotted outline, are to be provided.

Figures 6, 7:
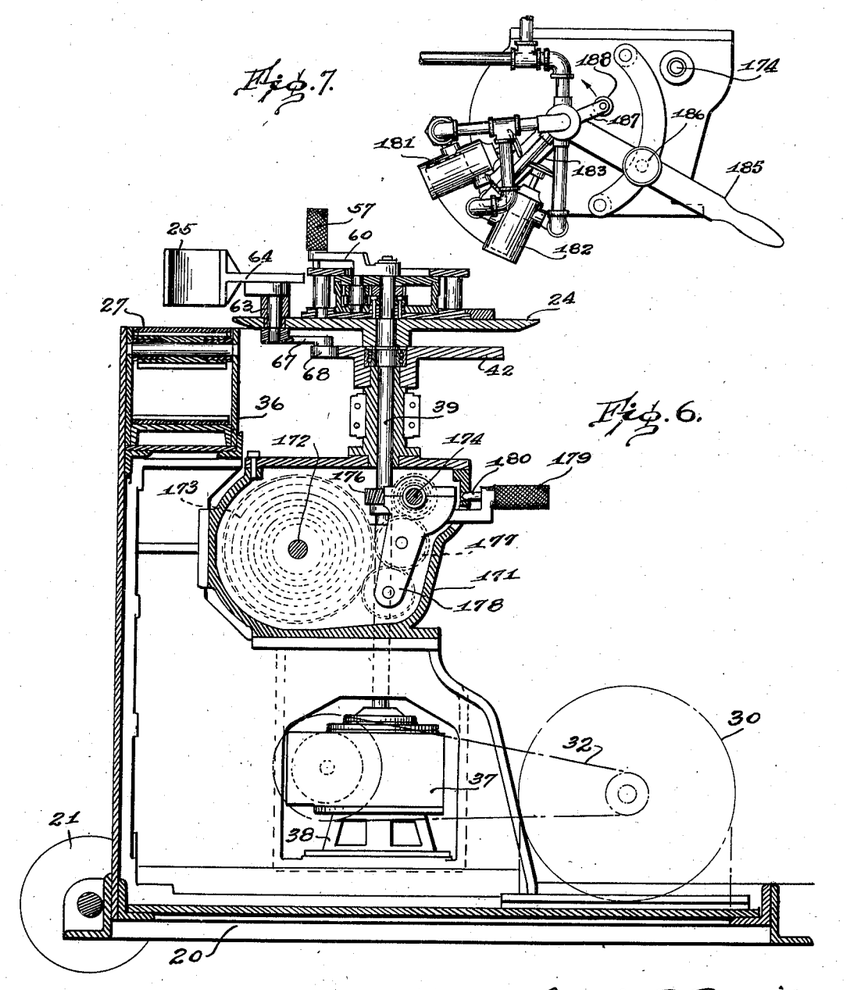
Fig. 6 is a sectional elevation at the line VI—VI on Fig. 1.
Fig. 7 is a view showing the valves which control the operation of a pusher bar, and adjusting means for timing such operations to synchronize with the movements of the transfer arms.
Figure 8:
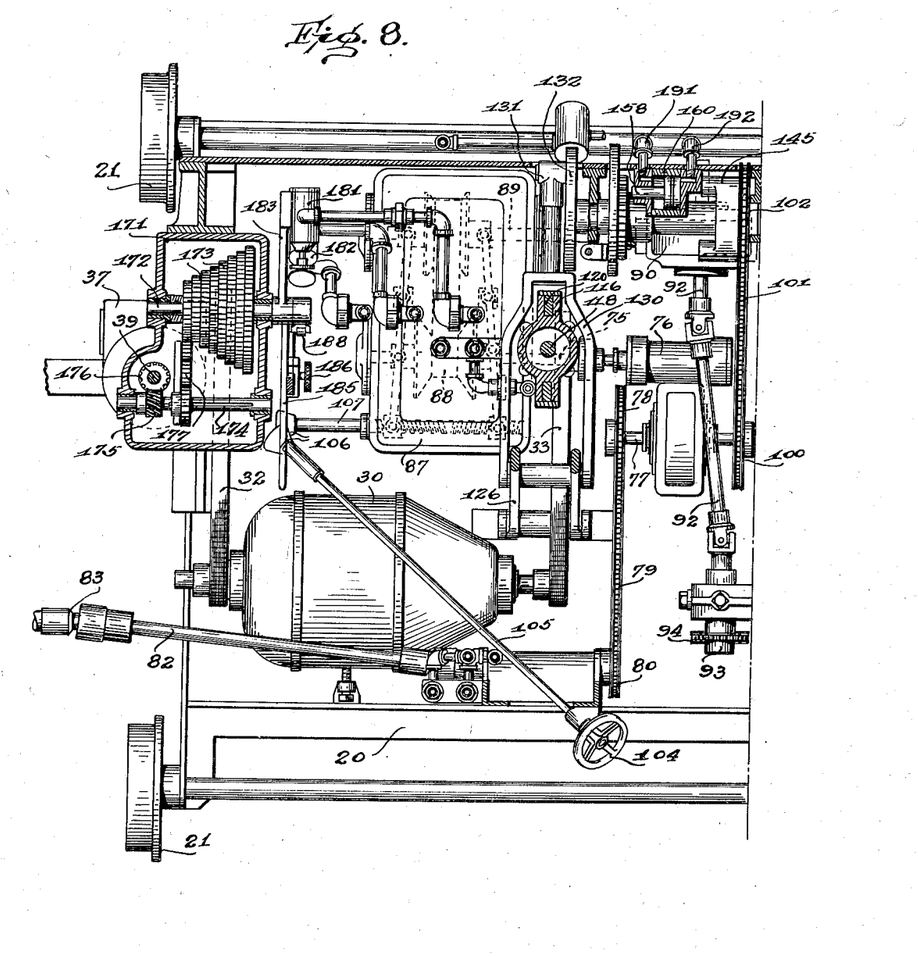
Fig. 8 is a sectional plan view of the left hand half of the machine, the section being substantially at the line VIII—VIII on Fig. 2.

The mechanism for initiating the operations of the pusher bar, and for adjustably varying these time intervals, as shown in Figs. 6, 7, and 8, will now be described. The shaft 39 which rotates the transfer arms 25, extends through a gear box 171 in which is journaled a shaft 172. A graduated series of gears 173 are mounted on said shaft. A shaft 174 journaled in the gear box parallel to shaft 172, carries a spiral gear 175 in mesh with a spiral gear 176 on the shaft 39. A train of gears 177 supported on an arm or frame 178 provides a driving connection from the shaft 174 to the gears 173. The arm 178 with the gears thereon, is shiftable lengthwise of the shaft 174 by means of a handle 179 carrying detent 180 (see also Fig. 2) for shifting the gear train into mesh with any one of the gears 173. The detent 180 engages holes in the casing 171 to hold the parts in adjusted position. An indicating plate or scale 180a indicates the adjustment and may be provided with a series of numbers as shown to indicate, for example, the number of bottles placed in a row for each adjustment.

Valves 181 and 182 (Figs. 7 and 8) control the operation of the air motor 160 (Fig. 8). These valves are supported on a carrier 183 which is mounted on the shaft 172 and is adjustable about the axis of said shaft. The adjustment is effected by a hand lever 185, and the parts are held in adjusted position by means of a clamping screw 186. An arm 187 keyed to the shaft 172 carries a roll 188 which, as the shaft rotates, engages the stems of the valves 181 and 182, thereby opening said valves in succession. The valve 181 when opened admits air to the motor 160 so that it operates to withdraw the plunger 158, thereby initiating the reciprocating movement of the pusher bar as heretofore described. The valve 182 when opened, causes a reversal of the motor 160 and returns the plunger 158.

It will be seen that by shifting the adjusting lever 185, the time at which the pusher bar commences its operation may be adjustably varied and controlled to correspond with the position of the bottles on the cross conveyor and particularly the last bottle of a row, so that interference with the oncoming bottles for the next succeeding row will be avoided.

Air motor control system

Figure 16:
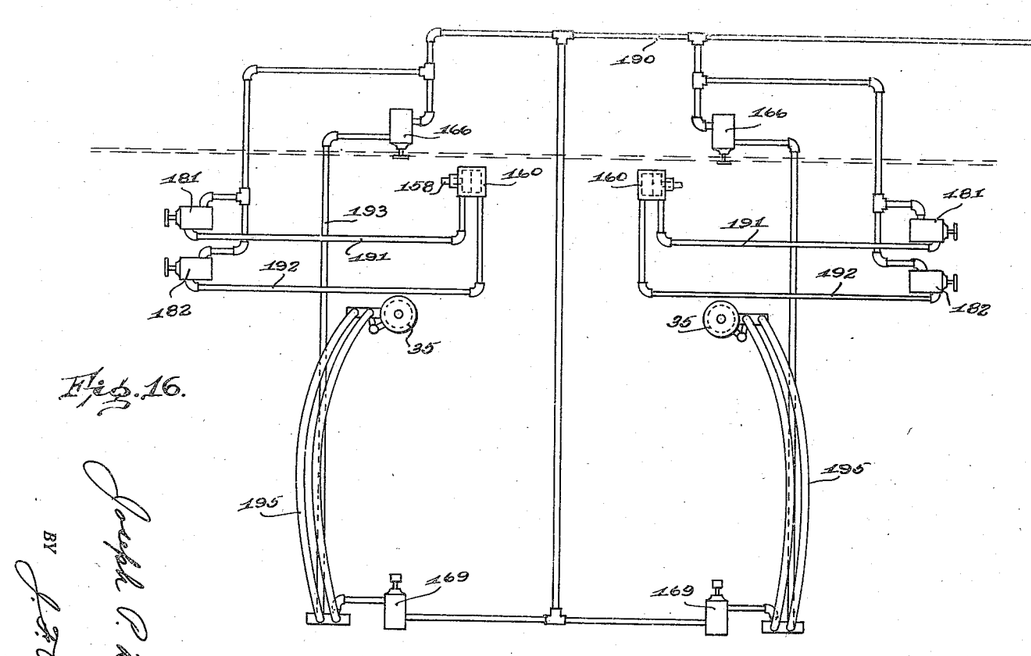
Fig. 16 is a diagrammatic view showing the air motors, valves and piping therefor, controlling the movements of the pusher bars.

The order in which the air motors and their control valves are actuated will be understood by reference to the diagram (Fig. 16). Air under pressure is continuously supplied to the valves through a pipe 190. When valve 181 is opened by the roll 188 (Fig. 7), air is supplied through a pipe 191 to the motor 160, thus retracting the plunger 158 and starting the driving mechanism for the pusher bar. Following this, the valve 182 is opened supplying air through a pipe 192 to the motor 160 for projecting the plunger 158. As the pusher bar completes its forward stroke, the valve 166 is opened, supplying air through pipe line 193 to the lower end of the motor 35, so that the latter operates to lift the pusher bar. When the latter completes its horizontal return stroke, the valve 169 is operated thereby supplying air through pipe line 195 to the upper end of motor 35 for lowering the pusher bar, thus completing the cycle of operations.

Modifications may be resorted to within the spirit and scope of my invention.

I claim:

1. The combination with a lehr, of mechanism for conveying articles and transferring them to the lehr, said mechanism comprising end conveyors, abutting cross conveyors extending across the front of the lehr, means for transferring articles from each said end conveyor to a cross conveyor and placing the articles in rows thereon, means for driving the cross conveyors and causing them to carry the articles inwardly from opposite ends of the lehr opening toward the center thereof, means individual to the cross conveyor for transferring the rows of articles to the lehr as the individual rows are formed, and means individual to each said transferring means for regulating the relative speeds of operation of each transferring means with its corresponding cross conveyor to regulate the spacing of the articles in the lehr and to permit said lehr to receive a full quota of articles regardless of the relative sizes of the articles transferred from each end conveyor.

2. The combination of traveling conveyors extending transversely to a given horizontal line with one of the conveyors positioned beyond the other in a horizontal direction transverse to said line, means for driving the conveyors and causing them to travel inwardly toward said line, means for placing articles on the conveyors and causing them to be arranged in rows thereon, means individual to said conveyors for transferring said rows of articles from the conveyors in a direction transverse to the conveyors as said rows are completed on each conveyor, means for adjustably shifting said conveyors in the direction of their length, and adjusting means interconnecting said transferring means and said conveyors individually adapted to vary the time relation therebetween in accordance with the position of adjustment of the conveyors in the direction of their length.

3. The combination of traveling conveyors extending transversely to a given horizontal line with one of the conveyors positioned beyond the other in a horizontal direction transverse to said line, means for driving the conveyors and causing them to travel inwardly toward said line, means for placing articles on the conveyors and causing them to be arranged in rows thereon, means individual to said conveyors for transferring said rows of articles from the conveyors in a direction transverse to the conveyors as said rows are completed on each conveyor, a support on which said conveyors are mounted, manually operated mechanism for shifting said support in a direction parallel with said conveyors and thereby bodily shifting the conveyors as a unit, and adjusting means interconnecting said transferring means and said conveyors individually adapted to vary the time relation therebetween in accordance with the position of adjustment of the conveyors in the direction of their length.

4. The combination of traveling belt conveyors arranged end to end and in the same horizontal plane, means for driving said conveyors and causing them to travel toward each other continually, means for placing articles serially on the conveyors and causing the articles on each conveyor to be carried thereby toward the other conveyor, whereby the articles are arranged in rows on the conveyors, and mechanism individual to each conveyor and adjustably timed therewith for periodically pushing the rows of articles off the conveyors in a direction transverse thereto.

5. Article conveying and transfer mechanism comprising a continuously traveling conveyor, means for placing articles in succession on the conveyor and causing them to be arranged in rows thereon, a pusher bar, interconnected mechanism between the conveyor and pusher bar for periodically and intermittently operating the pusher bar at predetermined time intervals, adjusting means for adjustably varying the length of said time intervals with relation to the length of travel of said conveyor across a predetermined width of said lehr, said adjusting means being capable of adjustment during operation of the machine, and separate adjusting means to advance or retard the time at which the operation of the pusher bar is initiated without changing the length of said time intervals.

6. The combination of a continuously horizontally traveling conveyor, means for placing articles on the conveyor and causing them to be arranged in rows thereon, a pusher bar extending lengthwise of the conveyor, a piston motor comprising a cylinder and a piston reciprocable up and down therein, means connecting the pusher bar with said piston for movement up and down therewith, a carriage on which the motor cylinder is supported, horizontal guides on which the carriage is mounted to reciprocate, said guides extending transversely of the conveyor and pusher bar, a driving element, means for intermittently rotating said driving element through one complete rotation, driving connections between said element and said carriage, whereby the carriage is reciprocated and the pusher bar caused to move forward across the conveyor for removing a row of articles therefrom and then return, a valve controlling the upward movement of the piston, means for actuating said valve when the pusher bar reaches its forward position and thereby causing the motor to lift the pusher bar, a second valve controlling the downward movement of the piston, means for actuating said second valve when the piston has about completed its return horizontal movement and thereby causing the motor piston to move downward and lower the pusher bar, and adjusting means associated with said driving element and said conveyor for varying the timing of a stroke of said pusher bar with relation to the travel of said conveyor.

7. The combination of an open-ended lehr, apparatus for conveying articles and transferring them to the lehr, comprising conveyors extending across the lehr opening, means individual to each of said conveyors for driving said conveyors in directions to carry articles inwardly from the ends of said opening toward the center thereof and thereby arranging the articles in rows in front of the lehr, shifting elements individual to and moving in timed relation with each of said conveyors for moving said rows into said lehr as they individually form, and adjusting means associated with each of said shifting elements for varying the timing of the strokes of said elements with relation to the travel of said conveyors.

8. The combination of an open-ended lehr, apparatus for conveying articles and transferring them to the lehr, comprising conveyors extending across the lehr opening, means individual to each of said conveyors for driving said conveyors in directions to carry articles inwardly from the ends of said opening toward the center thereof and thereby arranging the articles in rows in front of the lehr, means for adjusting the conveyors in the direction of their length so as to divide the width of the lehr between the conveyors in accordance with the relative number and size of articles conveyed thereby, and shifting elements individual to and moving in timed relation with each of said conveyors for moving said rows into said lehr as they individually form.

9. The combination of a lehr having a front opening to receive articles to be annealed, a lehr belt within said lehr, two conveyors at the front opening of the lehr adapted to carry articles seriatim inwardly across the lehr opening toward a predetermined point from two independent sources and thereby arranging the articles in rows in front of the lehr, automatic means individual to and moving in timed relation with each of said conveyors and operating periodically to move said rows of articles onto the lehr belt as the rows form on said conveyors, and means for regulating and coordinating the movement of said conveyors and automatic means so that the lehr belt receives a full quota of articles regardless of the relative speeds and sizes of the articles carried by each conveyor.

10. The combination of a lehr having a front opening to receive articles to be annealed, a lehr belt within said lehr, two abutting conveyors lying in the same vertical plane at the front opening of the lehr adapted to carry articles seriatim inwardly across the lehr opening toward a predetermined point on said lehr belt from two independent sources and thereby arranging the articles in rows in front of the lehr, automatic means individual to and moving in timed relation with each of said conveyors and operating periodically to move said rows of articles onto the lehr belt as the rows form on said conveyors, and means for regulating and coordinating the movement of said conveyors and automatic means so that the lehr belt receives a full quota of articles regardless of the relative speeds and sizes of the articles carried by each conveyor.

11. The combination of traveling conveyors extending transversely to a given horizontal line with one of the conveyors positioned beyond the other in a horizontal direction transverse to said line, means for driving the conveyors and causing them to travel inwardly toward said line, means for placing articles on the conveyors and causing them to be arranged in rows thereon, a receiving conveyor traveling in a direction parallel with the said line, pusher bars individual to said conveyors, means for actuating the pusher bars individually in timed relation with their individual conveyors and causing them to transfer the rows of articles to said receiving conveyor as said rows are completed on each conveyor, and means individual to each said placing means for regulating the relative speed of operation of each said placing means with respect to the speed of the corresponding traveling conveyors to regulate the spacing of the articles on said receiving conveyor and to permit said receiving conveyor to receive a full quota of articles regardless of the relative sizes of the articles transferred from each said traveling conveyors.

JOSEPH P. BENOIT.